(12) United States Patent
Kiene et al.

(10) Patent No.: US 8,470,174 B2
(45) Date of Patent: Jun. 25, 2013

(54) FILTRATION ARRANGEMENT FOR MICRO, ULTRA AND NANOFILTRATION

(75) Inventors: Klaus Kiene, Langenlonsheim (DE); Reinhard Voigt, Gotha (DE); Stefan Krause, Darmstadt (DE)

(73) Assignee: Microdyn-Nadir GmbH, Wiesbaden (DE)

( * ) Notice: Subject to any disclaimer, the term of this patent is extended or adjusted under 35 U.S.C. 154(b) by 381 days.

(21) Appl. No.: 12/920,353

(22) PCT Filed: Feb. 23, 2009

(86) PCT No.: PCT/EP2009/001265
§ 371 (c)(1),
(2), (4) Date: Aug. 31, 2010

(87) PCT Pub. No.: WO2009/109308
PCT Pub. Date: Sep. 11, 2009

(65) Prior Publication Data
US 2011/0000840 A1    Jan. 6, 2011

(30) Foreign Application Priority Data

Mar. 3, 2008    (DE) .......................... 10 2008 012 305

(51) Int. Cl.
*B01D 65/00*    (2006.01)
*B01D 63/08*    (2006.01)

(52) U.S. Cl.
USPC . 210/249; 210/153; 210/321.75; 210/327.84; 210/436; 210/472; 210/500.1

(58) Field of Classification Search
USPC ................ 210/153, 232, 236, 244, 246, 249, 210/292, 293, 321.6, 321.75, 321.84, 435, 210/455, 500.1, 436, 472
See application file for complete search history.

(56) References Cited

U.S. PATENT DOCUMENTS

| | | | | |
|---|---|---|---|---|
| 4,816,150 A | * | 3/1989 | Pierrard et al. | 210/321.82 |
| 7,972,510 B2 | * | 7/2011 | Morita et al. | 210/321.69 |
| 8,210,042 B2 | * | 7/2012 | Mickols et al. | 73/587 |
| 2005/0000881 A1 | * | 1/2005 | Bruss | 210/321.61 |
| 2008/0100993 A1 | * | 5/2008 | Muller et al. | 361/624 |

FOREIGN PATENT DOCUMENTS

| | | |
|---|---|---|
| DE | 10 2006 022502 A1 | 11/2007 |
| EP | 0 129 663 A1 | 1/1985 |
| EP | 0 707 884 A1 | 4/1996 |
| JP | 07 299339 A1 | 11/1995 |
| JP | 2001 087763 A1 | 4/2001 |
| JP | 2005 211733 A1 | 8/2005 |
| WO | WO 03/037489 A1 | 5/2003 |
| WO | WO 2007/122839 A1 | 11/2007 |

* cited by examiner

*Primary Examiner* — John Kim
(74) *Attorney, Agent, or Firm* — ProPat, L.L.C.

(57) ABSTRACT

The invention relates to a filtration device including a flat filter module and a base housing, on which the flat filter module is placed. A wall of the base housing includes a polymer cellular lightweight construction material, or a fiber composite material.

36 Claims, 4 Drawing Sheets

FILTRATION ARRANGEMENT FOR MICRO, ULTRA AND NANOFILTRATION

CROSS-REFERENCE TO RELATED APPLICATIONS

This application is being filed under Rule 1.371 as a National Stage Application of pending International Application No. PCT/EP2009/001265 filed Feb. 23, 2009, which claims priority to parent application German Patent Application No. 10 2008 012 305.6, filed Mar. 3, 2008. Both International Application No. PCT/EP2009/001265 and German Patent Application No. 10 2008 012 305.6 are hereby incorporated by reference herein in their entirety.

FIELD OF THE INVENTION

The present invention relates to a filtration arrangement for micro, ultra and nanofiltration, which is based on flat filter elements.

BACKGROUND OF THE INVENTION

Conventional filtration systems for sewage purification consist of filtration modules with a tubular or box-shaped housing in which a plurality of flat filter elements are arranged, spaced apart, parallel to one another. The interspaces between adjacent flat filter elements form throughflow passages. A liquid to be filtered, designated as raw liquid or retentate, is conducted via feed lines or through orifices in the housing walls into the interior of the tubular or box-shaped housing, flows over the flat filter elements and flows out through discharge lines or further orifices in the housing walls. The flat filter elements are configured as pads or cartridges and comprise a flexible drainage layer or rigid drainage plate which is surrounded on both sides by filtration membranes. The flat filter elements have run-off orifices, to which are connected lines through which filtered liquid, designated below as permeate, is discharged.

EP 0 707 884 A1 (whose United States equivalent is U.S. Pat. No. 5,626,752) discloses an arrangement for the filtration and separation of, in particular, biologically organic flow media by reverse osmosis and micro, ultra and nano filtration, with a pressure-tight housing, with an inlet for the flow medium and with outlets for the retentate and the permeate and with a number of filter elements which are arranged in the housing and are spaced apart from one another and which are designed in the manner of a membrane pad and around which the flow medium flows, a number of separate stacks of membrane pads being arranged one behind the other or next to one another in the housing, and the flow medium flowing around the stacks one behind the other or next to one another.

EP 0 129 663 A1 teaches a membrane pad for water desalination by reverse osmosis, ultrafiltration, hyperfiltration, gas permeation and the like, in which a drainage layer is arranged between two outer membranes and the drainage layer is welded continuously, and pressure-tight, to the membranes in a marginal zone.

WO 03/037489 A1 (whose United States equivalent is U.S. Patent Application No. 2005/000881) describes a filtration module for the purification of sewage, with a plurality of filter membrane pockets which have at least one orifice for dewatering their inner space and which are arranged vertically, parallel and preferably at an equal distance from one another in a rigid holder so that a liquid is capable of flowing intensively through the interspaces lying between adjacent filter membrane pockets.

Some of the known filtration modules have a box-shaped housing, with two or four side walls which are arranged opposite one another in pairs and which delimit a spatial volume having a rectangular flow cross section. Flat filter elements are mounted in the housing in such a way that they form a stack which subdivides the spatial volume surrounded by the housing into a plurality of flow ducts of equal size. The purpose of receiving and holding the flat filter elements is served, for example, by a number of grooves, arranged in pairs and parallel to one another, in two side walls of the housing which are arranged opposite one another. Marginal portions of the flat filter elements are fixed in the grooves by means of adhesive joints or mechanical holding devices.

Conventionally, the raw liquid is routed by means of a pump through the filtration module in the vertical direction from the bottom upward. In particular, air-operated mammoth pumps (compressed-air lifts) are used. In this case, compressed air is introduced from a compressor, via compressed-air lines below the filtration modules, into the raw liquid. At the location of introduction, the density of the raw liquid is greatly reduced by the air introduced, and, due to the buoyancy, a flow directed from the bottom upward is formed. The compressed-air lines are equipped, as a rule, with a multiplicity of outlet nozzles. Expediently, the outlet nozzles are arranged uniformly in a horizontal area in such a way that the outflowing air forms a rising bubble carpet which partially or completely fills the flow cross section of the filtration modules.

When a filtration system is operating continuously, particles, the diameter of which is too large to pass through the pores of the filtration membrane, are retained on the surface of the filtration membranes and partially remain in adherence. As a result of the accumulation of such particles over a lengthy period of time, a filter cake builds up, which increasingly blocks the membrane surfaces and reduces the filtration capacity of the system.

In order to restore or reacquire the filtration capacity, the membrane surfaces are regularly cleaned within the framework of plant maintenance. For this purpose, the membrane surface is cleaned mechanically, for example by means of brushes or a water jet or by means of backwashing. The mechanical cleaning is sometimes also accompanied by the use of chemical cleaning agents (chemomechanical cleaning).

During assembly and maintenance, and also during operation, sometimes considerable mechanical forces act upon the filtration arrangement. This applies particularly when a large filtration module with a filtration area of more than 30 $m^2$ is lifted for maintenance purposes out of a liquid to be filtered. The liquid absorbed and retained by the porous filtration membranes increases the weight of the filtration module to considerable extent. Moreover, in a multiplicity of applications, such as, for example, in sewage treatment plants, the liquid to be filtered contains sludge of higher viscosity which adheres to the surface of the flat filter elements and, in practice, does not flow off when the filtration arrangement is lifted as a consequence of maintenance. This adhering sludge, which fills the interspaces virtually completely especially in the case of closely packed flat filter elements, may have a weight of up to a few hundred kilograms. When the filtration arrangement is being lifted as a consequence of maintenance, its load-bearing construction must therefore withstand a load of up to one ton.

In order to ensure the mechanical stability or rigidity necessary for this purpose, the side walls of the filtration arrangement are reinforced and connected to one another by means of a frame or bracings consisting of a stable material, such as, for example, steel. Frame structures of this type are complicated and costly to produce and, moreover, increase the dead weight of the filtration arrangement.

SUMMARY OF ADVANTAGEOUS EMBODIMENTS OF THE INVENTION

Accordingly, the object of the present invention is to provide a filtration arrangement which has an especially high filtration density, that is to say large filtration area, in relation to its dead weight, in a compact type of construction, while at the same time having high mechanical stability and a low dead weight.

A further object of the invention is to provide a filtration arrangement which can be produced simply and cost-effectively in structural terms, has low flow resistance and a low tendency to blockage and can easily be maintained and repaired.

This object is achieved by means of a filtration arrangement comprising a flat filter module and a pedestal housing with a walling consisting of a polymeric cellular lightweight construction material or of a composite fiber material.

BRIEF DESCRIPTION OF THE FIGURES

The invention is described in more detail below with reference to the diagrammatic illustration of the figures in which.

DETAILED DESCRIPTION OF ADVANTAGEOUS EMBODIMENTS OF THE INVENTION

Figure 1:
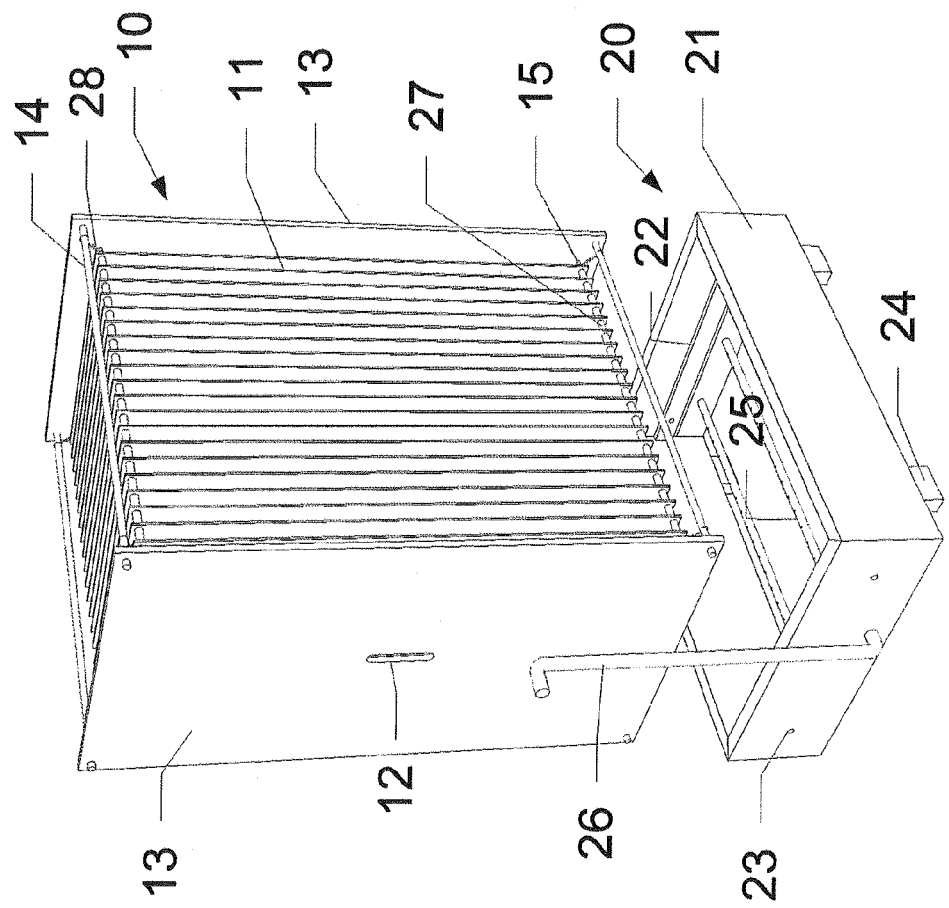
FIG. 1 shows a filtration arrangement with a flat filter module and a pedestal housing in an exploded perspective view.
Figure 1A:
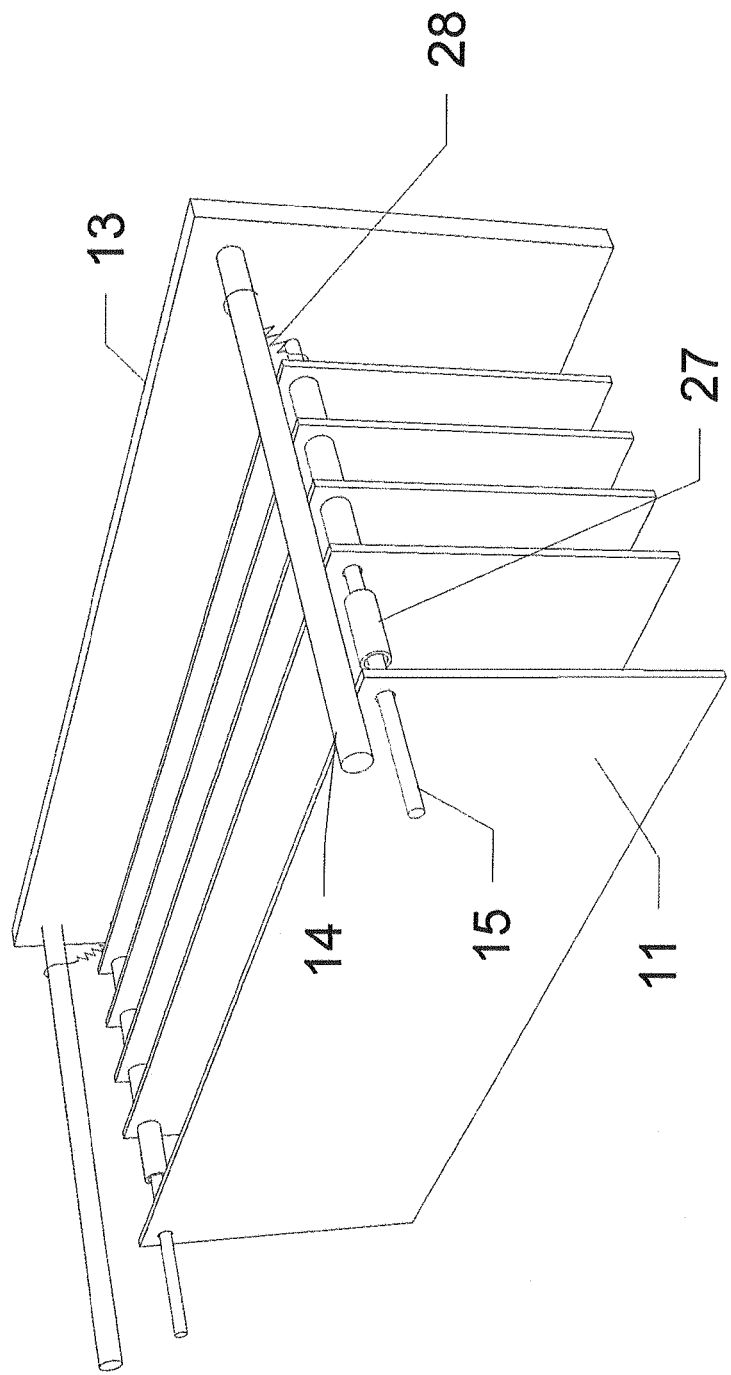
FIG. 1a shows, in detail, the suspension of the flat filter elements in the flat filter module.

FIG. 1 shows a perspective view of an embodiment of a filtration arrangement according to the invention with a flat filter module 10 and with a pedestal housing 20. The flat filter module 10 comprises at least one flat filter element or a plurality of flat filter elements 11 spaced apart parallel to one another and a module frame constructed from two end plates 13 and four frame bars 14.

The flat filter elements 11 contain a drainage layer which is enclosed between two outer filtration membranes and which is connected on both sides to the filtration membranes so as to adhere to them over a large area. The drainage layer expediently consists of one or more fabrics composed of yarns, filaments or wires composed of polymers and/or metals, one or more nonwovens composed of polymers, or a combination of these fabrics and nonwovens. The drainage layer is preferably in the form of spacer knits.

The filtration membranes may be connected to the drainage layer over the full area, in a punctiform manner or linearly by the application of a reactive or hot-melt adhesive.

Thermal welding and ultrasonic welding are likewise suitable methods for producing such a bond. The flat filter elements 11 are sealed, pressure-tight, at the margins, in order to prevent a penetration of raw liquid.

The filtration membranes of the flat filter elements 11 preferably consist of polyethersulfone, polysulfone, polyacrylonitrile, polyvinylidene fluoride, polyamide, polyetherimide, cellulose acetate, reclaimed cellulose, polyolefins, fluoropolymers and may be produced, for example, in that nonwovens or fabrics are coated with polymer solution and the pores are generated in a subsequent phase inversion step or in that polymer films are suitably drafted, so that the desired pores are obtained. Many of these filtration membranes are obtainable commercially, for example under the designation NADIR® membranes (NADIR Filtration GmbH, Wiesbaden) or Celgard® flat sheet membranes (Celgard Inc., Charlotte, N.C., USA).

Preferably, the flat filter elements 11 and the end plates 13 have a rectangular form. In alternative embodiments of the invention, the flat filter elements and the end plates 13 may have a square, hexagonal, round, oval or other geometric form.

In an especially preferred embodiment of the invention, the end plates 13 are manufactured from a polymeric lightweight construction material. The polymeric lightweight construction material is a cellular composite material, which comprises, for example, a honeycomb structure, or is a composite fiber material. Furthermore, according to the invention, polymeric lightweight construction material with a hollow-chamber structure is employed.

The flat filter elements 11 have four liquid-tight holding orifices which are arranged near the corners of the flat filter elements 11 and through which four holding bars 15 are led. The holding bars 15 are equipped at each of their two ends with a thread (not shown). In each case four tubular spacers 27 which surround the holding bars 15 are arranged between adjacent flat filter elements 11. The length of the holding bars 15 is greater than the thickness of the stack formed by the flat filter elements 11 and the spacers, those ends of the holding bars 15 which are equipped with threads projecting out of the end plates 13. The stack formed from the flat filter elements 11 is fixed on the holding bars 15 with the aid of nuts (not shown) screwed on the end-side threads of the holding bars 15.

For holding the flat filter elements 11 in the module frame, the holding bars 15 are fastened to the frame bars 14 by means of suspensions. Steel springs 28 are preferably used as suspensions. The steel springs are arranged near the corners of the stack formed from the flat filter elements 11, in particular between the end-side flat filter elements and those adjacent thereto.

For the discharge of permeate, the flat filter elements 11 are connected to one another via permeate orifices and tube-like permeate lines arranged between adjacent flat filter elements 11. Moreover, the first flat filter element 11 in the stack is connected via a further permeate line to a permeate leadthrough in the adjacent end plate 13. The permeate leadthrough is connected to a run-off line 12 on that side of the end plate 13 which faces outward and lies opposite the flat filter elements 11. The form of the permeate orifices and permeate lines is configured in such a way that the permeate lines have a large inner cross-sectional area, while at the same time low flow resistance for the raw liquid flowing on their outside. In the embodiment illustrated in FIG. 1, the permeate lines have, for example, a tubular cross section in the form of a vertically running elongate oval composed of a rectangle and of two end-face roundings.

Figure 2:
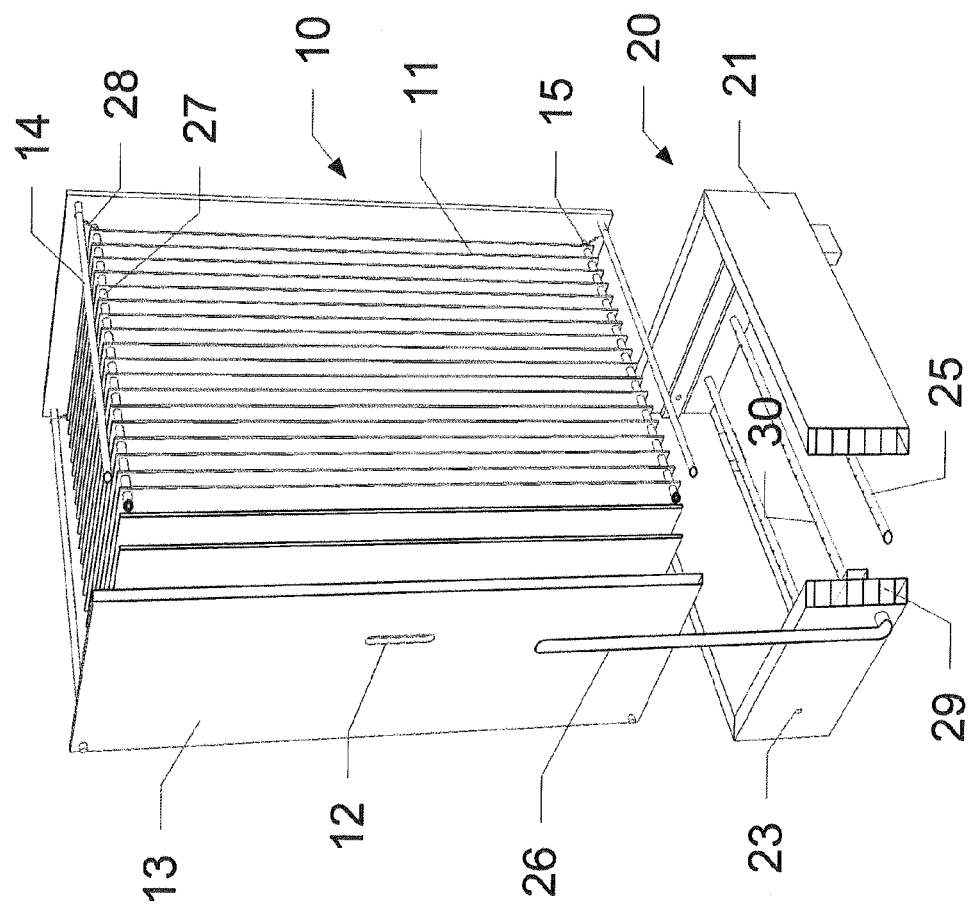
FIG. 2 shows a filtration arrangement according to FIG. 1 with a partially sectional pedestal housing and flat filter module.
Figure 3:
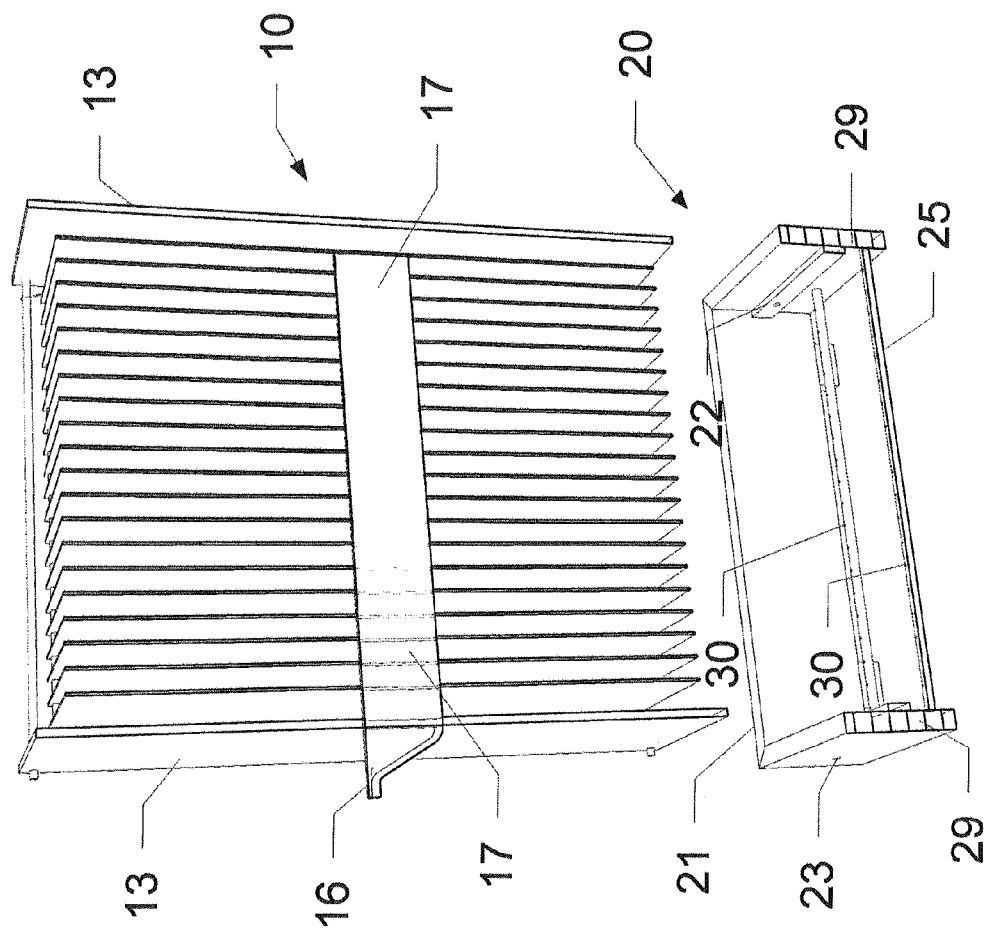
FIG. 3 shows a perspective sectional view through the filtration arrangement according to FIG. 1.

As is evident from FIG. 2, the pedestal housing 20 comprises a walling consisting of four housing walls 21 composed of a polymeric lightweight construction material, housing feet 24, two to four bearing webs 22, ventilation pipes 25 and a compressed-air feed line 26 which is connected to the ventilation pipes 25. The bearing webs 22 serve for supporting or holding the flat filter module 10 in the pedestal housing 20, the end plates 13 being seated on the bearing webs 22. The bearing webs 22 are fastened to the housing walls 21 by fastening means 23, for example bolts, screws and the like. The ventilation pipes 25 have outlet nozzles 30.

On the pedestal housing 20, the housing feet can even be omitted, so that the walling is seated directly on the floor or a base. The bearing webs 22 can also be connected to the housing walls 21 by means of ultra or thermal welding. The bearing webs 22 are manufactured from the same polymeric material as the housing walls 21, but may also consist of material different from this.

Preferably, the housing walls 21 consist of polymeric hollow-chamber plates. Hollow-chamber plates composed of thermoplastic polymers, such as polypropylene or polyethylene, are produced on an industrial scale and are offered commercially as semi-finished products in a multiplicity of variants. These hollow-chamber plates are manufactured, for example, by means of extrusion or by special thermal joining methods.

In a further embodiment of the invention, up to three housing walls 21 may consist of polymeric solid material plates and only a single housing wall 21 being manufactured from a polymeric hollow-chamber plate. Furthermore, embodiments are suitable in which two housing walls 21 are solid material plates and two housing walls are hollow-chamber plates or three housing walls 21 are hollow-chamber plates and one housing wall 21 is a solid material plate.

According to the invention, hollow-chamber plates which have hollow chambers 29 separated, gas-tight, from one another are preferred. By an exactly fitting cutting and joining of the housing walls 21 consisting of such hollow-chamber plates, the hollow chambers 29 form a system of ring lines running inside the housing walls 21. The compressed-air feed line 26 is connected to the ventilation pipes 25 via one or else more of these ring lines.

The term "filtration density" is used below in order to designate the ratio of the filtration area to the dead weight of the filtration arrangement in the dry state. The filtration arrangement according to the invention has a filtration density of 5 to 10 m²/kg, preferably of 10 to 15 m²/kg, and especially preferably of 15 to 20 m²/kg.

Preferably, the pedestal housing has a load-bearing capacity of higher than 200 kg, preferably of higher than 500 kg and especially preferably of higher than 1000 kg.

According to the invention, the polymeric lightweight construction material of which the walling of the pedestal housing consists is a cellular composite material. The cellular composite material is of a single-ply or multi-ply construction, at least one ply having a cellular structure. The term "cellular structure" designates a material with a multiplicity of cavities (cells) which are surrounded by webs and/or walls. The webs and walls may be arranged regularly in the manner of a periodic space lattice or run in a completely irregular way. The cavities may be connected to one another or be separated completely from one another by closed walls. Preferably, the cellular composite material comprises a honeycomb structure, for example with regularly arranged hexagonal cavities in the form of honeycombs.

In another embodiment of the invention, the polymeric lightweight construction material is a composite fiber material composed of a matrix polymer which contains reinforcing fibers of natural or synthetic origin, such as, for example, carbon fibers. The reinforcing fibers are added to a melt of the matrix polymer during the production of the composite fiber material.

Preferably, the polymeric lightweight construction material comprises a hollow-chamber structure. According to the invention, the walling of the pedestal housing is distinguished by the following properties:

| Property/measuring method | Dimension | Value | |
|---|---|---|---|
| Weight by unit volume | kg/m³ | preferably: | ≦350 |
| | | especially | ≦300 |
| | | preferably: | ≦250 |
| Thickness* | cm | preferably: | 0.5 to 20 |
| | | especially | 1 to 10 |
| | | preferably: | 2 to 8 |
| Mechanical compressive strength*/ DIN 53 421 | Mpa | preferably: especially preferably: | ≧1 ≧2 ≧3 |
| Bulk modulus*/ DIN 53 421 | Mpa | preferably: especially preferably: | ≧60 ≧100 ≧200 |
| Shear strength*/ DIN 53 294 | Mpa | preferably: especially preferably: | ≧0.5 ≧1 ≧2 |
| Shear modulus*/ DIN 53 294 | Mpa | preferably: especially preferably: | ≧10 ≧15 ≧20 |

*measured in a direction perpendicular to the surface of the walling

In a development of the invention, the pedestal housing is equipped with a ventilation device for a mammoth pump. The ventilation device comprises a compressed-air feed line and ventilation pipes with outlet nozzles, the ventilation pipes preferably being connected to the compressed-air feed line via one of the hollow chambers 29 in the walling of the pedestal housing.

In a further embodiment, the ventilation pipes 25 are connected directly to the compressed-air feed line 26 of the ventilation device in such a way that the compressed-air feed line is led, sealed off, through one of the housing walls 21 of the pedestal housing 20 and is connected to the ventilation pipes 25.

In addition to high filtration density, the filtration arrangement according to the invention is distinguished by low flow resistance. The number and size of surfaces or structures on which coarse impurities of the raw liquid, such as, for example, hairs and fibers, are often caught, are low. The multisidedly open type of construction of the filtration arrangement according to the invention makes it easier, moreover, to carry out the mechanical cleaning of the membrane surfaces, since it makes it possible to introduce cleaning appliances or a water jet into the gap between adjacent flat filter elements essentially from all sides. Cleaning appliances which may be considered are, for example, round or flat brushes, of which the size in one dimension is smaller than/equal to the gap between adjacent flat filter elements. The individual flat filter element 11 can thus be cleaned thoroughly, since it is accessible from all sides, in particular on the underside, after the filtration module 10 has been lifted off from the pedestal housing 20.

Since up to 25 flat filter elements 11 are accommodated in a flat filter module 10, the individual flat filter element 11 having an area of 1 to 4 m², a compact type of construction is obtained.

The invention claimed is:
1. A filtration arrangement for micro, ultra and nano filtration, comprising a flat filter module and a pedestal housing with a walling consisting of a polymeric cellular lightweight construction material or of a composite fiber material.

2. The filtration arrangement as claimed in claim 1, wherein the polymeric lightweight construction material is a cellular composite material.

3. The filtration arrangement as claimed in claim 2, wherein the cellular composite material has a honeycomb structure.

4. The filtration arrangement as claimed in claim 1, wherein the polymeric lightweight construction material is a composite fiber material comprised of a matrix polymer which contains natural or synthetic reinforcing fibers.

5. The filtration arrangement as claimed in claim 1, wherein the polymeric lightweight construction material has a hollow-chamber structure with hollow chambers separated, gas-tight, from one another.

6. The filtration arrangement as claimed in claim 1, wherein the walling comprises four housing walls, of which at least one housing wall comprises a polymeric hollow-chamber structure, while the other housing walls consist of polymeric solid material.

7. The filtration arrangement as claimed in claim 6, wherein two housing walls have a polymeric hollow-chamber structure and two housing walls are polymeric solid material.

8. The filtration arrangement as claimed in claim 6, wherein three housing walls have a polymeric hollow-chamber structure and one housing wall consists of polymeric solid material.

9. The filtration arrangement as claimed in claim 1, wherein the walling of the pedestal housing has a weight unit volume of lower than 350 kg/m$^3$.

10. The filtration arrangement as claimed in claim 1, wherein the walling of the pedestal housing has a thickness of 0.5 to 20 cm.

11. The filtration arrangement as claimed in claim 1, wherein the walling of the pedestal housing has a mechanical compressive strength of higher than 1 MPa, measured perpendicularly to the surface of the walling according to DIN 53 421.

12. The filtration arrangement as claimed in claim 1, wherein the walling of the pedestal housing has a compressive modulus of higher than 60 MPa, measured perpendicularly to the surface of the walling according to DIN 53 421.

13. The filtration arrangement as claimed in claim 1, wherein the walling of the pedestal housing has a shear strength of higher than 0.5 MPa, measured perpendicularly to the surface of the walling according to DIN 53 294.

14. The filtration arrangement as claimed in claim 1, wherein the walling of the pedestal housing has a shear modulus of higher than 10 MPa, measured perpendicularly to the surface of the walling according to DIN 53 294.

15. The filtration arrangement as claimed in claim 1, wherein the pedestal housing is equipped with a ventilation device for a mammoth pump.

16. The filtration arrangement as claimed in claim 15, wherein the ventilation device comprises a compressed-air feed line and ventilation pipes with outlet nozzles, the ventilation pipes being connected to the compressed-air feed line via one or multiple hollow chambers in the walling of the pedestal housing.

17. The filtration arrangement as claimed in claim 15, wherein a compressed-air feed line is led sealingly through a housing wall of the walling and is connected directly to the ventilation pipes.

18. The filtration arrangement as claimed in claim 1, wherein the ratio of the filtration area to the weight of the filtration arrangement amounts to 5 to 10 m$^2$/kg.

19. The filtration arrangement as claimed in claim 1, wherein the pedestal housing has a load-bearing capacity of higher than 200 kg.

20. The filtration arrangement as claimed in claim 1, wherein the pedestal housing is equipped with or without housing feet, and wherein the insides of the housing walls have bearing webs for supporting a flat filter module.

21. The filtration arrangement as claimed in claim 9, wherein the walling of the pedestal housing has a weight unit volume of lower than 300 kg/m$^3$.

22. The filtration arrangement as claimed in claim 9, wherein the walling of the pedestal housing has a weight unit volume of lower than 250 kg/m$^3$.

23. The filtration arrangement as claimed in claim 10, wherein the walling of the pedestal housing has a thickness of 1 to 10 cm.

24. The filtration arrangement as claimed in claim 10, wherein the walling of the pedestal housing has a thickness of 2 to 8 cm.

25. The filtration arrangement as claimed in claim 11, wherein the walling of the pedestal housing has a mechanical compressive strength of higher than 2 MPa, measured perpendicularly to the surface of the walling according to DIN 53 421.

26. The filtration arrangement as claimed in claim 11, wherein the walling of the pedestal housing has a mechanical compressive strength of higher than 3 MPa, measured perpendicularly to the surface of the walling according to DIN 53 421.

27. The filtration arrangement as claimed in claim 12, wherein the walling of the pedestal housing has a compressive modulus of higher than 100 MPa, measured perpendicularly to the surface of the walling according to DIN 53 421.

28. The filtration arrangement as claimed in claim 12, wherein the walling of the pedestal housing has a compressive modulus of higher than 200 MPa, measured perpendicularly to the surface of the walling according to DIN 53 421.

29. The filtration arrangement as claimed in claim 13, wherein the walling of the pedestal housing has a shear strength of higher than 1 MPa, measured perpendicularly to the surface of the walling according to DIN 53 294.

30. The filtration arrangement as claimed in claim 13, wherein the walling of the pedestal housing has a shear strength of higher than 2 MPa, measured perpendicularly to the surface of the walling according to DIN 53 294.

31. The filtration arrangement as claimed in claim 14, wherein the walling of the pedestal housing has a shear modulus of higher than 15 MPa, measured perpendicularly to the surface of the walling according to DIN 53 294.

32. The filtration arrangement as claimed in claim 14, wherein the walling of the pedestal housing has a shear modulus of higher than 20 MPa, measured perpendicularly to the surface of the walling according to DIN 53 294.

33. The filtration arrangement as claimed in claim 18, wherein the ratio of the filtration area to the weight of the filtration arrangement amounts to 10 to 15 m$^2$/kg.

34. The filtration arrangement as claimed in claim 18, wherein the ratio of the filtration area to the weight of the filtration arrangement amounts to 15 to 20 m$^2$/kg.

35. The filtration arrangement as claimed in claim 19, wherein the pedestal housing has a load-hearing capacity of higher than 500 kg.

36. The filtration arrangement as claimed in claim 19, wherein the pedestal housing has a load-hearing capacity of higher than 1000 kg.

* * * * *

UNITED STATES PATENT AND TRADEMARK OFFICE
CERTIFICATE OF CORRECTION

PATENT NO. : 8,470,174 B2
APPLICATION NO. : 12/920353
DATED : June 25, 2013
INVENTOR(S) : Kiene et al.

It is certified that error appears in the above-identified patent and that said Letters Patent is hereby corrected as shown below:

In the Claims:

Column 8

Claim 35, line 61, delete "load-hearing" insert --load-bearing--

Claim 36, line 64, delete "load-hearing" insert --load-bearing--

Signed and Sealed this
Sixth Day of August, 2013

Teresa Stanek Rea
*Acting Director of the United States Patent and Trademark Office*